US012339851B2

(12) United States Patent
Sun et al.

(10) Patent No.: US 12,339,851 B2
(45) Date of Patent: Jun. 24, 2025

(54) WORKLOAD PERFORMANCE IMPROVEMENT ON HETEROGENEOUS SYSTEMS

(71) Applicant: INTERNATIONAL BUSINESS MACHINES CORPORATION, Armonk, NY (US)

(72) Inventors: Sheng Yan Sun, Beijing (CN); Xu Qin Zhao, Beijing (CN); Jian Xu, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/520,705

(22) Filed: Nov. 28, 2023

(65) Prior Publication Data
US 2025/0173339 A1    May 29, 2025

(51) Int. Cl.
*G06F 16/00*    (2019.01)
*G06F 16/2453*    (2019.01)
*G06F 16/2455*    (2019.01)
*G06F 16/248*    (2019.01)

(52) U.S. Cl.
CPC .. *G06F 16/24552* (2019.01); *G06F 16/24542* (2019.01); *G06F 16/248* (2019.01)

(58) Field of Classification Search
CPC ......... G06F 16/24552; G06F 16/24542; G06F 16/248
USPC .................................................. 707/600–899
See application file for complete search history.

(56) References Cited

U.S. PATENT DOCUMENTS

| 6,341,281 | B1 | 1/2002 | MacNicol et al. |
| 11,216,462 | B1* | 1/2022 | Jain ................. G06F 16/24542 |
| 11,256,695 | B1* | 2/2022 | He ..................... G06F 16/2453 |
| 11,308,106 | B1 | 4/2022 | Muralimanohar et al. |
| 11,636,108 | B1* | 4/2023 | Xu ......................... G06F 16/256 |
| | | | 707/714 |
| 2021/0117422 | A1* | 4/2021 | Cabrera Arevalo ....................... |
| | | | G06F 16/24542 |

(Continued)

OTHER PUBLICATIONS

"Implementation of Query Result Caching Using Dynamic Data Cache" M.A Ramteke, et al. (IJCSIT) International Journal of Computer Science and Information Technologies, vol. 5 (3), 2014. 4 pages.

(Continued)

*Primary Examiner* — Michelle N Owyang
(74) *Attorney, Agent, or Firm* — Lily Neff, Esq.; Rachel L. Pearlman, Esq.; Heslin Rothenberg Farley & Mesiti P.C.

(57) ABSTRACT

Computer implemented methods, systems, and computer program products include program code executing on a processor(s) to: obtain queries (each query including workload(s)); obtain execution statistics for the one or more workloads; normalize one or more queries. Normalizing includes generating cost analytics, identifying similar cost analytics for query blocks across the queries, and applying a cost model to identify at least one query block for result reuse across. The program code distributes the queries to system resources by assigning the at least one query block (in more than one query/workload) to a first resource to execute (as part of a first workload) against database tables and assigning the at least one query block to a second resource to execute (as part of a first workload) against a shared cache of a heterogenous database system.

18 Claims, 16 Drawing Sheets

(56) References Cited

U.S. PATENT DOCUMENTS

2023/0082010 A1* 3/2023 Clifford .............. G06F 16/2282
　　　　　　　　　　　　　　　　　　　　　　　707/736
2023/0161792 A1* 5/2023 Pandis .............. G06F 16/24542
　　　　　　　　　　　　　　　　　　　　　　　707/718

OTHER PUBLICATIONS

"Method for Improving Query Performance in a Heterogeneous Database System" Anonymous authors. Aug. 4, 2010. 8 pages.
"Polystore++: Accelerated Polystore System for Heterogeneous Workloads" Rakha Singhal, et al. May 24, 2019. 11 pages.

* cited by examiner

| | | | | |
|---|---|---|---|---|
| P_PARTKEY = PS_PARTKEY | 2 | 7 | P_PARTKEY | P_PARTKEY < 3000000 |
| P_PARTKEY = L_PARTKEY | 2 | | PS_PARTKEY | |
| L_PARTKEY = PS_PARTKEY | 3 | | L_PARTKEY | L_PARTKEY BETWEEN 110000 AND 145000 |
| C_NATIONKEY = N_NATIONKEY | 7 | 20 | C_NATIONKEY | C_NATIONKEY IN (1,3,5,7,9,11,13,15,17,19) |
| C_NATIONKEY = R_REGIONKEY | 8 | | N_NATIONKEY | N_NATIONKEY < 10 |
| R_REGIONKEY = N_NATIONKEY | 3 | | R_REGIONKEY | |
| C_NATIONKEY = S_NATIONKEY | 1 | | S_NATIONKEY | S_NATIONKEY IN (1,2,3,4,5) |
| S_NATIONKEY = N_NATIONKEY | 1 | | | |
| C_CUSTKEY = O_CUSTKEY | 8 | 8 | C_CUSTKEY | |
| | | | O_CUSTKEY | O_Custkey between 00000 and 45000 |
| O_ORDERKEY = L_ORDERKEY | 10 | 10 | O_ORDERKEY | |
| | | | L_ORDERKEY | L_ORDERKEY < 150000  L_ORDERKEY < 600000 |
| C_ACCTBAL = P_RETAILPRICE | 2 | 4 | C_ACCTBAL | C_ACCTBAL < 9000.00  C_ACCTBAL < 1500.00 |
| | | | P_RETAILPRICE | |
| C_ACCTBAL = S_ACCTBAL | 2 | | S_ACCTBAL | S_ACCTBAL BETWEEN 0 AND 440 |
| S_SUPPKEY = L_SUPPKEY | 2 | 7 | S_SUPPKEY | S_SUPPKEY < 10000 |
| L_SUPPKEY = PS_SUPPKEY | 3 | | L_SUPPKEY | L_SUPPKEY IN (1,22,333,4444,55555) |
| PS_SUPPKEY = S_SUPPKEY | 2 | | PS_SUPPKEY | |

FIG. 7

```
SELECT DISTINCT PERSON.DEERS_ID
FROM LWDIM.PERSON_D AS PERSON
     , LWDIM.ENRLE_PCM_F AS ENROLLEE_PCM
     , LWDIM.PROV_D AS T3
WHERE ( ENROLLEE_PCM.CURR_ENRLEPCM_MLT = 1
        AND PERSON.ENROLL_MLT = 1
        AND T3.PROV_TAX_ID LIKE '4865%'
        AND PERSON.PERSON_SK = ENROLLEE_PCM.PERSON_SK
        AND T3.PROVIDER_SK = ENROLLEE_PCM.PROVIDER_SK
      )
```

FIG. 9A

```
SELECT DISTINCT J72.FUND_CDE
     INTO :H
FROM PRSP#S.R11_A999 AS R11
INNER JOIN PRSP#S.FGS_A999 AS FGS
      ON R11.FI_FUND_GROUP_NBR = FGS.FI_FUND_GROUP_NBR
      AND R11.FINANCIAL_INST_ID = FGS.FINANCIAL_INST_ID
INNER JOIN PRSP#S.BP3_A999 AS BP3
      ON FGS.FCS_DTR_ID_1 = BP3.FCS_DTR_ID_1
      AND FGS.FCS_DTR_ID_2 = BP3.FCS_DTR_ID_2
INNER JOIN PRSP#S.J72_A999 AS J72
      ON BP3.FUND_CODE = J72.FUND_CDE
   WHERE J72.SEC_ISS_ID = :H
      AND R11.FIRM_NBR = :H
```

FIG. 9B

```
SELECT T1.C0
FROM TABLE
        ( SELECT CS_CONTACT.CS_CNTCT_ID AS C0
          FROM LOGIN.DATE_D AS T3
               , LOGIN.CS_CNTCT_D AS CS_CONTACT
               , LOGIN.CS_CNTCT_DTL_F AS CS_CONTACT_DETAIL
          WHERE   T3.DATE BETWEEN '2009-01-01' AND '2009-01-28'
                  AND CS_CONTACT.CS_CNTCT_SK = CS_CONTACT_DETAIL.CS_CNTCT_SK
        ) AS T0( C0)
    , TABLE
        ( SELECT CS_CONTACT.CS_CNTCT_ID AS C0
          FROM LOGIN.DATE_D AS T3
               , LOGIN.CS_CNTCT_D AS CS_CONTACT
               , LOGIN.CS_CNTCT_DTL_F AS CS_CONTACT_DETAIL
          WHERE   T3.DATE BETWEEN '2009-01-01' AND '2009-01-28'
                  AND CS_CONTACT.CS_CNTCT_SK = CS_CONTACT_DETAIL.CS_CNTCT_SK
        )AS T1(C0)
WHERE T1.C0 = T0.C0
```

FIG. 10A

```
SELECT 'Y'
    INTO :H
FROM PRSPHS.AU8_A999 AS AU8
    WHERE AU8.NSCC_REQUEST_ID_1 = :H
       AND AU8.NSCC_REQUEST_ID_2 = :H
       AND AU8.NSCC_REQ_DIALOG_ID IN
    (SELECT AU8.NSCC_REQ_DIALOG_ID
FROM PRSPHS.AU8_A999 AS AU8
        WHERE AU8.NSCC_REQUEST_ID_1 = :H
           AND AU8.NSCC_REQUEST_ID_2 = :H
           AND AU8.NSCC_TRANS_TYPE_CD IN ('070'))
```

FIG. 10B

- Original Query 1111
```
SELECT s*
    FROM PRSP#S.AUS_A999 AS AU8
    WHERE AU8.NSCC_REQUEST_ID_1 = :H
      AND AU8.NSCC_REQUEST_ID_2 = :H
      AND AU8.NSCC_REQ_DIALOG_ID IN
    (SELECT AU8.NSCC_REQUEST_ID_1
FROM PRSP#S.AU8_A999 AS AU8
    WHERE AU8.NSCC_REQUEST_ID_1 = :H
      AND AU8.HSCC_REQUEST_ID_2 = :H
      AND AU8.NSCC_TRANS_TYPE_CD IN ('070'))
```

- Restructure the SQL 1112
```
SELECT AU8.NSCC_REQUEST_ID_1,
    AU8.NSCC_REQUEST_ID_2,
    AU8.NSCC_TRANS_TYPE_CD,
    COUNT(*) AS RESULT
WHERE AU8.NSCC_REQUEST_ID_1 IN
    (SELECT AU8.NSCC_REQ_DIALOG_ID
    FROM RSP#S.AU8_A999 AS AU8)
GROUP BY AU8.NSCC_REQUEST_ID_1,
    AU8.NSCC_REQUEST_ID_2,
    AU8.NSCC_TRANS_TYPE_CD
ORDER BY RESULT DESC
```

- Restructure the SQL 1113
```
SELECT AUS.NSCC_REQUEST_ID_1,
    AU8.NSCC_REQUEST_ID_2,
COUNT(*)
FROM PRSP#S.AU8_A999 AS AU8
    WHERE AU8.NSCC_REQ_DIALOG ID IN
    (SELECT AU8.NSCC_REQUEST_ID_1
FROM PRSP#S.AU8_A999 AS AU8
    WHERE AU8.NSCC_REQUEST_ID_1 = 1
      AND AU8.NSCC_REQUEST_ID_2 = 99999999990
      AND AU8.NSCC_TRANS_TYPE_CD IN ('a'))
GROUP BY AU8.NSCC_REQUEST_ID_1,
AU8.NSCC_REQUEST_ID_2 ,
ORDER BY RESULT DESC
```

- Sample the result 1116

| NSCC_REQUEST_ID_1 | NSCC_REQUEST_ID_2 |
|---|---|
| 1 | 99999999990 |

- Extract Join Predicate 1115

Due to no join predicates in this SQL, here shall be ignored.

- Sample the result 1114

| REQUEST_ID_1 | REQUEST_ID_2 | TRANS_TYPE_CD |
|---|---|---|
| 1 | 99999999990 | a |
| 2 | 99999999991 | a |
| 3 | 99999999992 | a |
| 4 | 99999999993 | a |
| 5 | 99999999994 | a |
| 6 | 99999999995 | a |
| 7 | 99999999996 | a |
| 8 | 99999999997 | a |
| 9 | 99999999998 | a |

- Muted SQL 1117
```
SELECT *
    FROM PRSP#S.AU8_A999 AS AU8
    WHERE AU8.NSCC_REQUEST_ID_1 = 1
      AND AU8.NSCC_REQUEST_ID_2 = 99999999990
      AND AU8.NSCC_REQ_DIALOC_ID IN
    (SELECT AU8.NSCC_REQUEST_ID_1
FROM PRSP#S.AU8_A999 AS AU8
    WHERE AU8.NSCC_REQUEST_ID_1 = 1
      AND AU8.NSCC_REQUEST_ID_2 = 99999999990
      AND AU8.NSCC_TRANS_TYPE_CD IN ('a'))
```

```
{
"docs":
[
  {
    "_id": "doc1",
    "firstname": "Sally",
    "lastname": "Brown",
    "age": 16,
    "location": "New York City, NY"
  },
  {
    "_id": "doc2",
    "firstname": "John",
    "lastname": "Brown",
    "age": 21,
    "location": "New York City, NY"
  },
  {
    "_id": "doc3",
    "firstname": "Greg",
    "lastname": "Greene",
    "age": 35,
    "location": "San Diego, CA"
  },
  {
    "_id": "doc4",
    "firstname": "Anna",
    "lastname": "Greene",
    "age": 44,
    "location": "Baton Rouge, LA"
  },
  {
    "_id": "doc5",
    "firstname": "Lois",
    "lastname": "Brown",
    "age": 33,
    "location": "Syracuse, NY"
  }
]
}
```

FIG. 15

WORKLOAD PERFORMANCE IMPROVEMENT ON HETEROGENEOUS SYSTEMS

BACKGROUND

The present invention relates generally to the field of workload scheduling in database systems and, specifically, to optimizing system performance based on improved workload distribution techniques.

A database management system (DBMS) handles various query types, each with its own characteristics, which impact the system's performance. A heterogeneous database system refers to an automated (or semi-automated) system for the integration of heterogeneous, disparate database management systems to present a user with a single, unified query interface. Heterogeneous database systems (HDBs) refer to computational models and software implementations that provide heterogeneous database integration. In information systems, in general, workloads can be executed consecutively or in parallel by different resources and one or more DBMSs is responsible for distributing these workloads. Various systems (e.g., applications) within a computing environment will issue structured query language (SQL) queries to a DBMS in order to fetch the data of interest. The DBMS can tune and distribute these queries and the manner in which the queries are tuned and distributed affects the performance of the systems in the computing environment. Generally, the heterogeneity of a given environment, into which a DBMS distributed queries (e.g., workloads) is transparent to a given user who benefits from the results of queries. In some heterogenous database environments, a DBMS can automatically distribute workload to different nodes based on system enablement and/or under certain conditions.

When a DBMS tunes a query or workload, the program code of the DBMS can consider the execution eligibility of a SQL statement (e.g., query). The program code can determine execution eligibility of a given query by tracking query execution statistics related to objects referenced by a query including observing the execution of the query objects by different physical (software and/or hardware) processors as well as the operating system (OS) of the resources that execute the query. Collecting a variety of statistics can help inform workload distribution by the DBMS but sometimes in many current systems, the DBMS distributes workloads based on pre-established rules and, in some systems, the intelligence gained from the statistics is provided as a recommendation rather than an automated process. Also, may approaches are not transparent to the user and in particular, the heterogeneity of the system (and whether that plays into workload distribution) is not transparent in current approaches.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided through the provision of a computer-implemented method for scheduling query execution of one or more queries in a heterogenous database system. The method can include: obtaining, by one or more processors, the one or more queries, wherein each query of the one or more queries comprises the one or more workloads; obtaining, by the one or more processors, execution statistics for the one or more workloads; normalizing, by the one or more processors, the one or more queries, wherein the normalizing comprises: generating, by the one or more processors, cost analytics for query blocks comprising the one or more queries; identifying, by the one or more processors, based on the cost analytics, similar cost analytics for one or more query blocks across the one or more queries; and applying, by the one or more processors, a cost model to the one or more query blocks across with the similar cost analytics to identify at least one query block for result reuse across at least two queries of the one or more queries; and distributing, by the one or more processors, based on the execution statistics, the one or more queries to a portion of the resources, wherein the distributing comprises assigning the at least one query block in a first query of the two queries to a first resource to execute the at least one query block against one or more database tables of the heterogenous database system and assigning the at least one query block in a second of the two queries to a second resource to execute the at least one query block against a shared cache of the heterogenous database system.

Shortcomings of the prior art are overcome, and additional advantages are provided through the provision of a computer program product for scheduling query execution of one or more queries in a heterogenous database system. The computer program product comprises a storage medium readable by a one or more processors and storing instructions for execution by the one or more processors for performing a method. The method includes, for instance: obtaining, by the one or more processors, the one or more queries, wherein each query of the one or more queries comprises the one or more workloads; obtaining, by the one or more processors, execution statistics for the one or more workloads; normalizing, by the one or more processors, the one or more queries, wherein the normalizing comprises: generating, by the one or more processors, cost analytics for query blocks comprising the one or more queries; identifying, by the one or more processors, based on the cost analytics, similar cost analytics for one or more query blocks across the one or more queries; and applying, by the one or more processors, a cost model to the one or more query blocks across with the similar cost analytics to identify at least one query block for result reuse across at least two queries of the one or more queries; and distributing, by the one or more processors, based on the execution statistics, the one or more queries to a portion of the resources, wherein the distributing comprises assigning the at least one query block in a first query of the two queries to a first resource to execute the at least one query block against one or more database tables of the heterogenous database system and assigning the at least one query block in a second of the two queries to a second resource to execute the at least one query block against a shared cache of the heterogenous database system.

Shortcomings of the prior art are overcome, and additional advantages are provided through the provision of a system for scheduling query execution of one or more queries in a heterogenous database system. The system includes: a memory, one or more processors in communication with the memory, and program instructions executable by the one or more processors via the memory to perform a method. The method includes, for instance: obtaining, by the one or more processors, the one or more queries, wherein each query of the one or more queries comprises the one or more workloads; obtaining, by the one or more processors, execution statistics for the one or more workloads; normalizing, by the one or more processors, the one or more queries, wherein the normalizing comprises: generating, by the one or more processors, cost analytics for query blocks comprising the one or more queries; identifying, by the one or more processors, based on the cost analytics, similar cost analytics for one or more query blocks across the one or more queries; and applying, by the one or more processors, a cost model to the one or more query blocks across with the similar cost analytics to identify at least one query block for result reuse across at least two queries of the one or more queries; and distributing, by the one or more processors, based on the execution statistics, the one or more queries to a portion of the resources, wherein the distributing comprises assigning the at least one query block in a first query of the two queries to a first resource to execute the at least one query block against one or more database tables of the heterogenous database system and assigning the at least one query block in a second of the two queries to a second resource to execute the at least one query block against a shared cache of the heterogenous database system.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 7 illustrates functionality of a predicate analyzer which can be utilized to determine whether query block results can be reused between executors in the present disclosure;

FIGS. 9A and 9B represent two contrasting queries, one with a host variable (FIG. 9A) and one without a host variable (FIG. 9B) that can be analyzed by program code in the present disclosure;

FIGS. 10A and 10B represent subquery pattern mutations performed by program code in the present disclosure;

FIG. 11 illustrates program code in the present disclosure performing an analytical analysis on a subquery (to craft the query into a form in which it can be compared to other query blocks);

FIG. 12 illustrates program code in the present disclosure performing an analytical analysis on a subquery (to craft the query into a form in which it can be compared to other query blocks);

FIG. 15 illustrates a structure of documents in a NoSQL database that can be utilized in the present disclosure;

DETAILED DESCRIPTION

Figure 1:
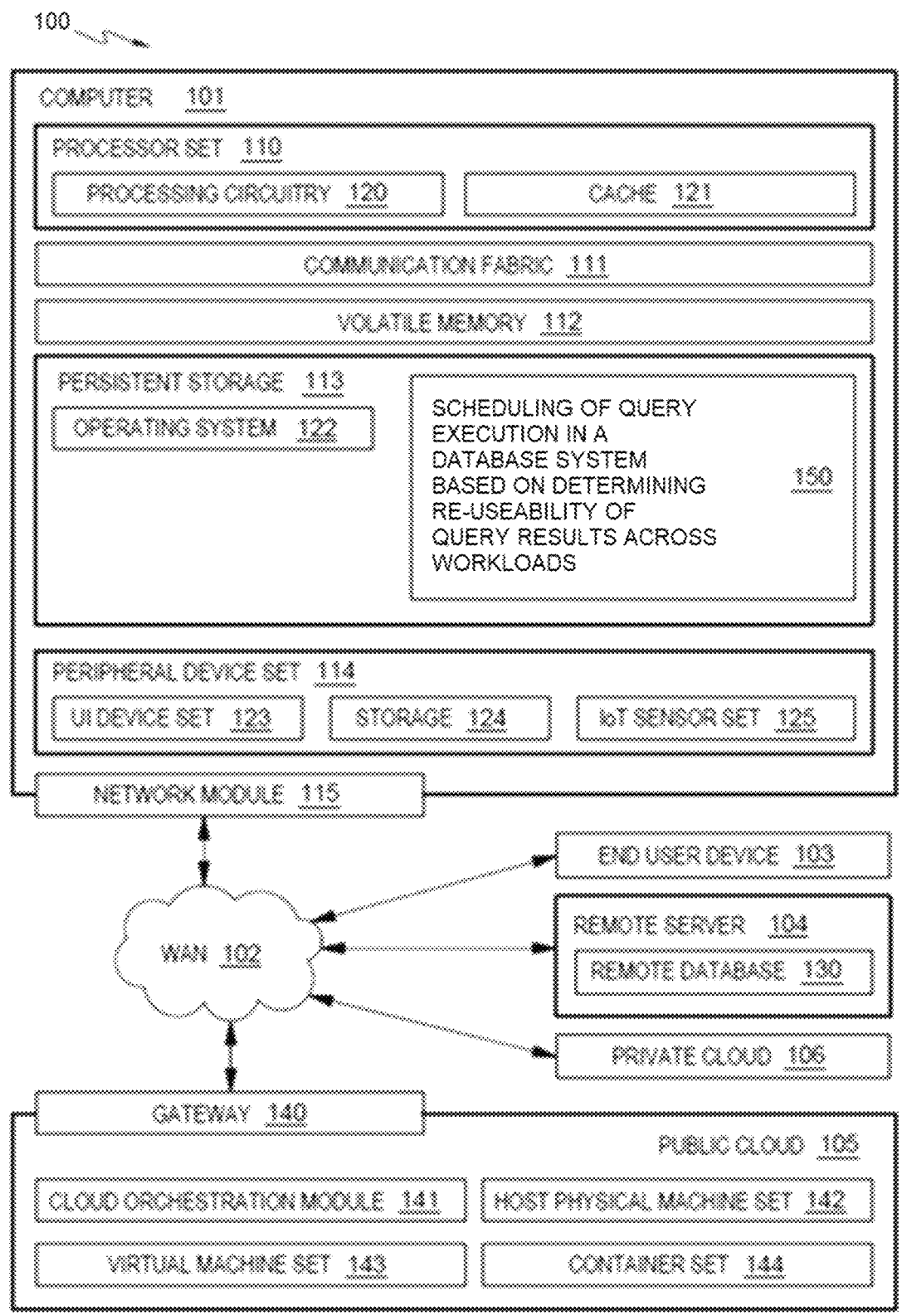
FIG. 1 depicts one example of a computing environment to perform, include and/or use one or more aspects of the present disclosure.

In the context of this paper, a "workload" refers to a group of queries which are sent to one or more databases (e.g., by a requestor, which can include an application). The examples herein include computer-implemented methods, computer program products, and computer systems where program code executing on one or more processors enables improved performance in workload execution in computing environments with heterogenous database systems. Program code in the examples herein can automatically distribute workloads in heterogenous database systems while also providing transparency to users. The examples herein improve workload performance on heterogenous computing in part by executing program code (on one or more processors) by transmitting different portions of workloads to different resources (e.g., locations) based on different granular groupings of these portions, including but not limited to: on a query statement level (from specific applications and/or utilizing specific storage), on a query block level, and/or on an anticipated query result level. In some examples, program code can obtain a query block level result by distributing query elements for which the result was returned between different storage solutions in the heterogenous database environment, including but not limited to, utilizing high-speed storage to return a portion of the result, thus, improving the performance of the associated workload, as a whole, and/or re-using a results set for one or more query blocks between different workloads.

One can implement examples disclosed herein in a NoSQL (Not only SQL) heterogeneous database. NoSQL databases can be referred to as non-relational databases and they do not require fixed schema. Working in NoSQL databases, users can create documents with flexible schema and can scale up evenly. The flexible architecture of NoSQL databases enables these databases to process information in a distributed manner and to accommodate tremendous volumes of data. NoSQL databases are thus utilized predominantly in for Big Data (datasets referred to as "Big Data" generally have at least a million rows) and ongoing applications. NoSQL databases can be utilized to house and manage terabytes of data, daily.

As noted above, in the examples herein, program code executing on one or more processors can distribute parts of queries on a granular level to achieve optimal system performance, including distributing portions of the same query block to different types of system resources. A SQL statement (in a relational database), or a selector (in a database that is not relational) (which can be referred to as a query itself) can consist of several subqueries, which are represented by query blocks (e.g., including in access plans). A subquery can include SELECT, INSERT, UPDATE, and/or DELETE statements. A subquery can contain other subqueries in the FROM clause, the WHERE clause, or a sub-selection of a UNION or UNION ALL. A subquery within another subquery can be referred to as a child subquery. A subquery that contains another subquery can be referred to as a parent subquery. The parent-child relationship between queries and subqueries can be represented by a tree hierarchy.

In some examples herein, program code executing on one or more processors: 1) generates and/or obtains system statistics and workload analytical date to determine anticipated query performance (e.g., which queries will not adversely affect system performance) including determining performance when a given query executes in different workload groupings; 2) normalizes queries in workloads in part, to determine cost analytics for similar query blocks including generating a cost model representing re-use of a given query (e.g., based on a similar query); 3) manages a cache to enable reuse of query blocks result by different workload queries; 4) broadcasts data relevant to each workload to obtain different query distribution possibilities, including from the cache (managed by the program code), based on the database resources of the heterogeneous database system; and/or 5) gathers a workload result and throughput and writes the resource(s) to a fact table (including quantitative throughput).

In some examples herein, a fact table can be utilized by the program code to improve processing of workloads in the system, moving forward. As understood by one of skill in the art, a fact table is the central table in a schema (e.g., star, snowflake) of a data warehouse (e.g., including the database systems described herein). A fact table stores quantitative information for analysis and is often denormalized. The program code in the examples herein can analyze dimensional data stored in the fact table to increase throughput efficiencies in the database system. The throughput information can be quantitative in nature. A fact table consists of two types of columns: foreign keys to enable joins with dimension tables and measures columns that contain the data that is being analyzed. In one example, if a business utilizing a database system conducts sales, a corresponding fact table can contain columns representing both raw facts and aggregations in rows such as: $12,000, being "sales for New York store for 15 Jan. 2005". $34,000, being "sales for Los Angeles store for 15 Jan. 2005." The "facts" in a fact table refers to the facts of a process. In the examples herein, the "facts" in the fact table are related to workload distribution to various resources in a heterogenous database system. Fact tables are often defined by their grain. The grain of a fact table represents the most atomic level by which the facts may be defined. The grain of a sales fact table might be stated as "sales volume by day by product by store". Each record in this fact table is therefore uniquely defined by a day, product, and store. Other dimensions might be members of this fact table (such as location/region) but these add nothing to the uniqueness of the fact records. These "affiliate dimensions" allow for additional slices of the independent facts but generally provide insights at a higher level of aggregation (a region contains many stores). The use of a fact table is explained as related to the business process of sales for illustrative purposes only as processes which include both business processes and/or processes inextricably tied to computing, can potentially be improved based on program code executing on one or more processor analyzing the contents of a fact table for a given schema.

Embodiments of the present invention are inextricably tied to computing and are directed to a practical application. The examples herein provide a computer-based solution to an issue in computing. Many applications and products rely on executing queries in databases. How these queries pull data from various databases within computing systems, such as distributed systems, can be managed by middleware, including database management software. As computing systems grow and enterprise, hybrid, and cloud or other distributed computing environments become more prevalent, inefficient queries can stress the system as a whole and can compromise the performance of the system. The examples herein are inextricably tied to computing at least because they improve the utilization and efficiency of resources in a heterogenous database system, to execute queries and provide results to users in a transparent manner. In the examples herein, program code executing on one or more processors provides a reasonable and effective use of heterogeneous database multilevel storage and multilevel processor resources, which enables a customer to plan hardware configurations. Additionally, the program code maintains workload distribution among database resources in both an intelligent and transparent manner. The program code in the embodiments herein is inextricably tied to computing because it provides an approach for executing queries from applications in a computing environment on the resources of that environment. For example, the program code in examples herein can distribute different parts of workloads to different resources, taking advantage not only of different processing resources but also of different storage resources (comprising the heterogenous database system). To that end, the program code transmits different parts of a workload for execution on different resources (processing and storage) while also can reuse query block level results between high-speed storage resources to improve performance further.

The examples herein provide significantly more than existing approaches to enabling a DBMS (database management system) to optimize resource utilization through efficient query distribution. When compared to existing approaches, the examples herein provide reasonable and effective uses of heterogeneous database multilevel storage and multilevel processor resources and enable customers to plan hardware configuration. Additionally, program code in examples herein maintains processes throughout their whole lifecycle in an intelligent manner that is transparent to the user. In the examples herein, unlike some existing approaches the program code provides a unique combination of benefits in some examples (and for at least this reason, significantly more than existing approaches), which include: 1) the program code produces system concurrency and synchronization; 2) the program code provides query normalization and query block analytics; 3) the program code analyzes query predicates (e.g., condition expression that evaluates to a Boolean value, either true or false); 4) program code can utilize a NoSQL heterogenous database; 5) program code can maintain a whole process with intelligent user transparency; and/or 6) the program code can manage one or more cache centrally to maintain reuse of query block results between different workload queries.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block 150 for scheduling of query execution in a database system based on determining reuseability of query results across workloads. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allow the various components of computer 101 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
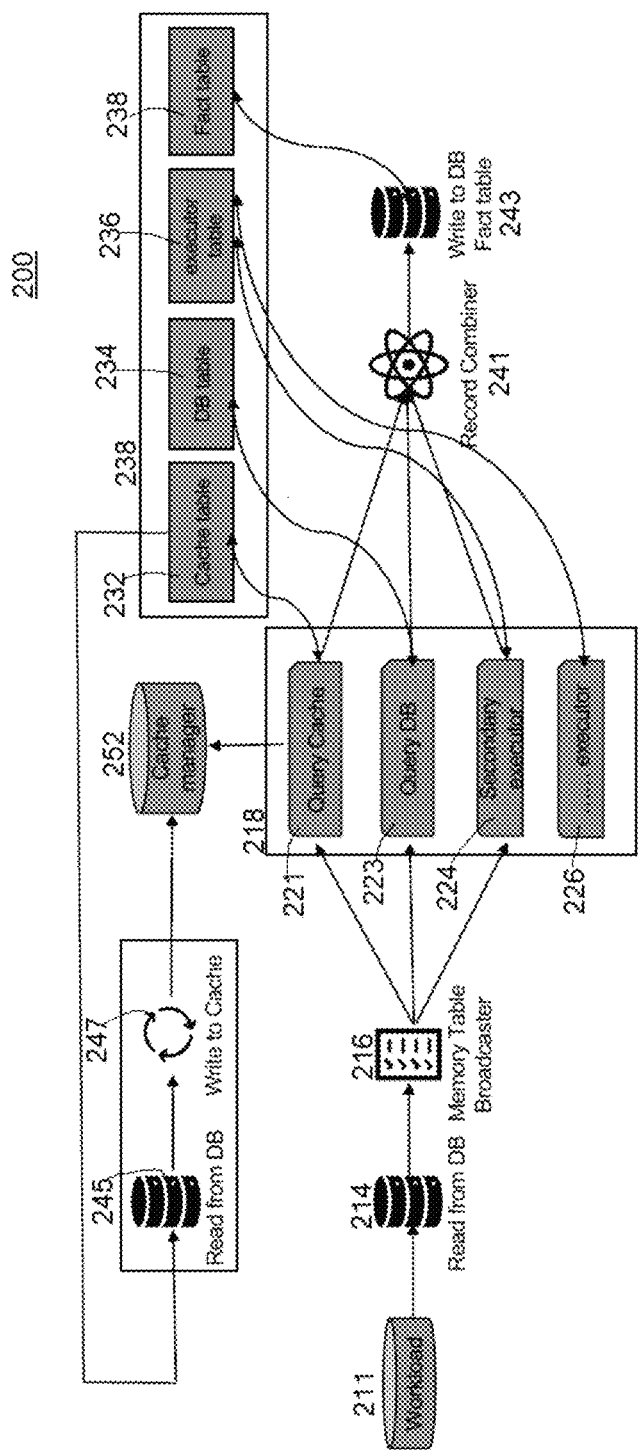
FIG. 2 illustrates elements of a technical computing environment where various aspects of the disclosure have been implemented.

FIG. 2 illustrates elements of a technical computing environment 200 where various aspects of the examples herein have been implemented. FIG. 2 illustrates how the examples herein improve workload performance on a heterogenous computing database by sending different parts of workloads to different locations based not only on the query statements on a specific application or the storage upon which this application executes on, but also, based on determining that various queries will produce the same block level result and thus, these results can be reused between high-speed storage systems to improve performance. As illustrated in FIG. 2, re-use of cached results assists in improving performance of the system. By normalizing the queries (which is discussed in greater detail and illustrated in additional figures), the program code can identify commonalities between queries in different workloads and hence, the workloads can share these queries.

As part of the processes performed by program code (executing on one or more processors) in the examples herein, program code obtains a workload 211, including by reading the workload from a database 214 that includes a queue of various workloads to be executed. The cue is populated with requests from different applications within a computing system. The program code farms the elements (queries) comprising workloads to different execution resources and/or caches (e.g., the database resources of the heterogeneous database system 218). The database resources of the heterogeneous database system 218, which execute queries in various workloads when the program code assigns these queries (or portions of queries) to these resources of the heterogeneous database system 218, execute the assigned queries against database tables 238 in the system. The program code broadcasts data including via a memory table broadcaster 216) relevant to each workload to obtain different query distribution possibilities, the database resources of the heterogeneous database system 218, which include a cache querying resource 221 that executes queries or a portions of the queries on one or more cache tables 232 that include results of historical and/or concurrent queries. In addition to the cache querying resource 221, the resources 221 can include a database querying resource 223 that executes queries on various database tables 234, a secondary executor 224, which executes queries on tables referenced in the query, referred to herein as executor tables 236, and/or one or more additional executors 226, which also execute queries on executor tables 236. The number of resources that execute queries or parts of queries in FIG. 2 is provided as a non-limiting example for illustrative purposes only. Although illustrated as separate, database tables 234 and the executor tables 236 can represent a common target and/or a partially common target as well as separate targets (for the queries in the workloads).

Depending upon decisions made by the program code (including identifying similar queries in different workloads which can utilize cached query results rather than executing against a tables that is not a cache table), the program code utilizes the resources of the heterogeneous database system 218 (e.g., cache querying resource 221, the database querying resource 223, the secondary executor 224, and one or more additional executors 226), to execute portions of various workloads on the database tables 238 (e.g., the cache tables 232, the database tables 234, and the executor tables 236, respectively).

As illustrated in FIG. 2, when the program code determines that cached data, including query results, can be utilized by queries in different workloads, the program code can assign a portion of a given workload to a cache querying resource 221, referred to, for brevity, in FIG. 2 as the query cache, so that this portion is executed by the program code on cache tables 232. When the program code pulls a query results from a cache table 232, performance of the system is improved as the same query block level result is reused between high-speed storage aspects of the architecture. In the examples herein, the program code can identify similar queries in different workloads and to assist in enabling this identification, the program code writes various aspects of the workloads executed by the system to a fact table 238. The program code combines (241) records (aspects of workloads distributed to the cache querying resource 221, the database querying resource 223, and a secondary executor 224, and also any additional executors 226 in some examples) and writes (243) the combined records to a fact table 238 for one or more fact tables). This fact table 238 stores quantitative information and can be utilized by the program code for analysis of query performance and to assist the program code in determining the efficiency of the distribution of the queries and reuse of the cached results between queries (e.g., various distribution plans).

In some examples herein, the cache table 232, which houses query results for reuse, can be actively managed by program code comprising a cache manager 252. Thus, the program code can identify portions of query blocks which are common across workloads and manage, e.g., via a cache manager 252, which results are stored for reuse in one or more cache table 232. The cache manager 252 is informed (e.g., managed) by program code which reads from one or more of the database tables 238, and writes to the cache table 232 (and/or instructs a cache manager 252 to write to the cache table 232).

Figure 3:
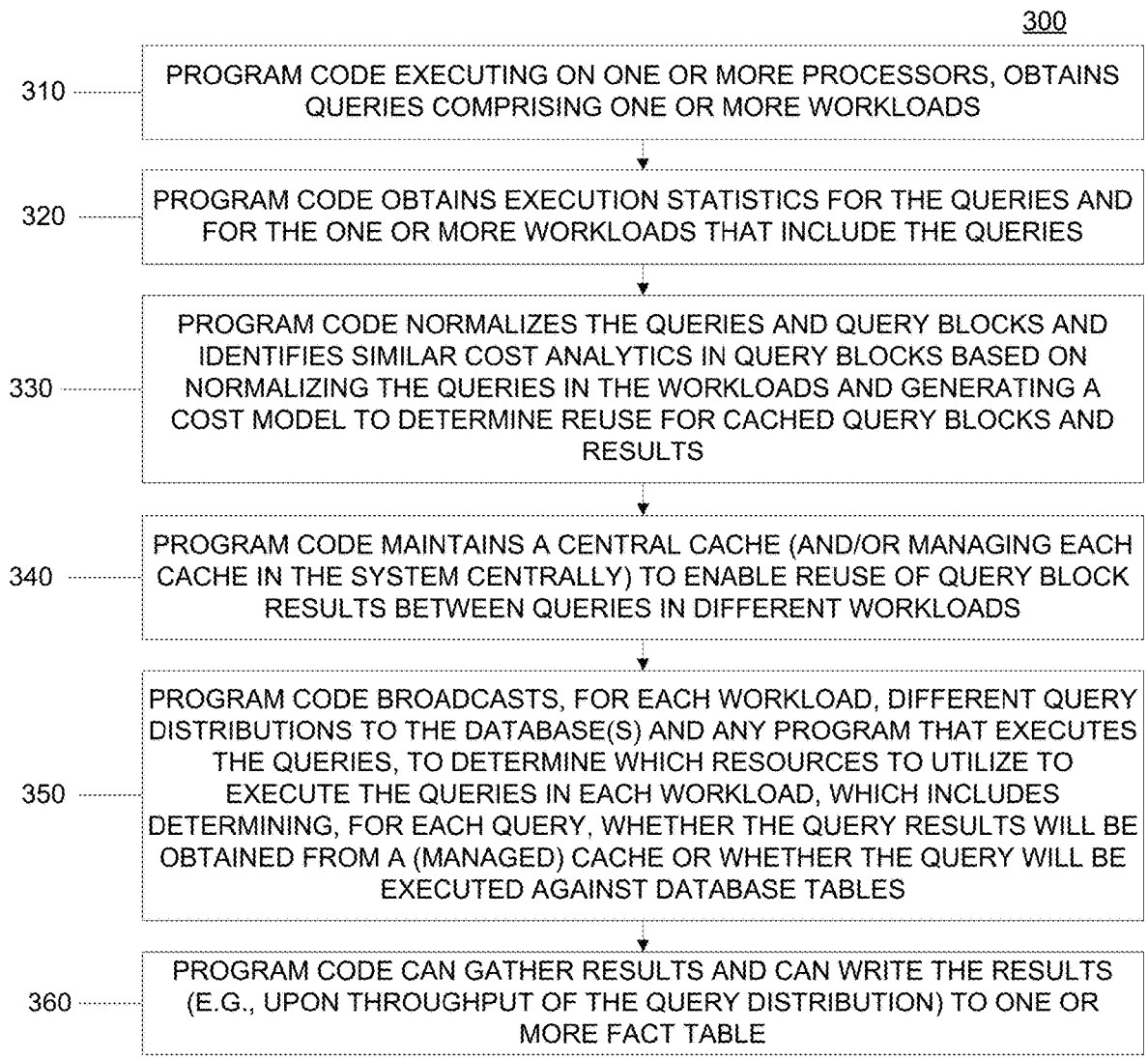
FIG. 3 illustrates a workflow of various aspects performed by the program code (executing on one or more processors) in some embodiments of the present disclosure.

FIG. 3 is a workflow 300 that illustrates various aspects of some examples herein. As illustrated in FIG. 3, program code executing on one or more processors, obtains queries comprising one or more workloads (310). The program code obtains execution statistics for the queries and for the one or more workloads that include the queries (320). By obtaining these statistics, the program code can perform system analytics to determine which types of queries can be executed in the system within performance expectations (e.g., queries and/or workloads that can be executed within various performance expectations will not adversely impact system performance). The program code can determine which queries are similar or different, including where there are different queries in the same workload or the same queries in different workloads or different workload groupings.

The program code normalizes the queries and query blocks and identifies similar cost analytics in query blocks based on normalizing the queries in the workloads and generating a cost model to determine reuse for cached query blocks and results (330). The program code, in normalizing the queries, can parse query blocks for duplicative portions (e.g., queries). In some examples, to normalize the queries, the program code analyzes predicates and normalizes the queries to identify which parts of query blocks are common and thus, results can be reused when the queries are executed. Based on analytics, the program code identifies that for particular workloads, the same query (e.g., query block) is part of each of these workloads (hence identifying common queries).

Once the program code identifies commonalities, it can determine whether reuse of results between resources executing the workloads with the commonality will increase system efficiency (e.g., reduce cost including by a predetermined amount). The program code can analyze the predicates in the workloads (and query blocks) to calculate a result for a reuse ratio (as efficiency is improved if like queries van be identified in different or in the same workloads and these queries can utilize cached results). In these examples, if the program code calculates a reuse ratio that is below a pre-determined threshold, the program code can determine that cached values will not be relevant to the query block. Thus, the program code can denote a query block with this lower than a desired reused ratio as being different and thus, will not maintain the query block in the cache. The program code can clean any data related to this query block from the cache maintained by the program code. When implemented on a heterogenous database, the program code can execute (or schedule execution of) each part of a workload and these portions of the workload can be executed independently and hence, in parallel. The program code can calculate a cost model that reflects reuse.

The program code maintains a central cache (and/or managing each cache in the system centrally) to enable reuse of query block results between queries in different workloads (340). The program code broadcasts, for each workload, different query distributions to the database(s) and any program that executes the queries, to determine which resources to utilize to execute the queries in each workload, which includes determining, for each query, whether the query results will be obtained from a (managed) cache or whether the query will be executed against database tables (350). The program code can gather results and can write the results (e.g., upon throughput of the query distribution) to one or more fact table (360). In some examples, the program code can gather results and can write the results (e.g., upon throughput of the query distribution) to one or more fact table. To that end, in some examples herein, join-pairs (tables with join relationships) via a semi-join from the dimension to the fact table index can dynamically run, in parallel, on different executors (e.g., resources) and the program code can filter the intersection via the fact table.

Figure 4:
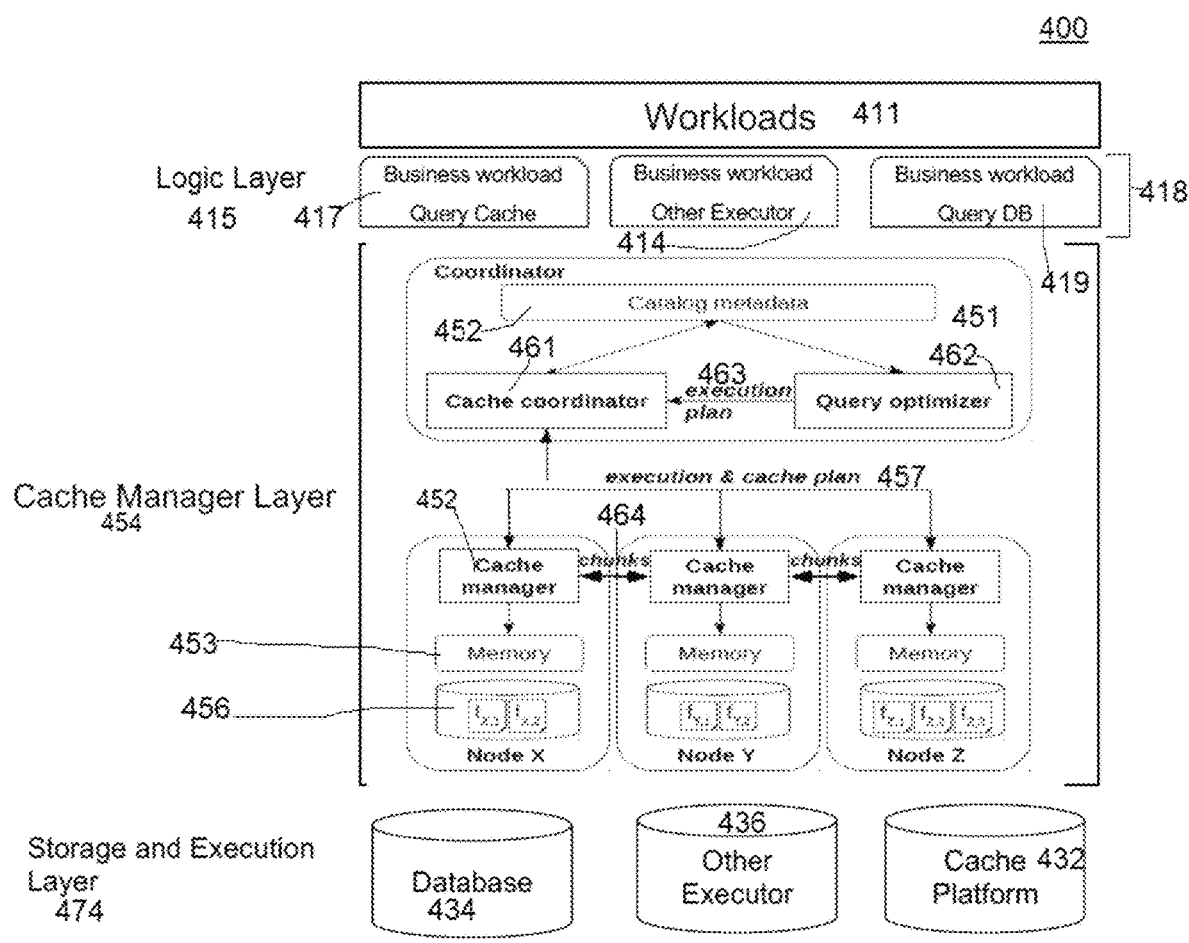
FIG. 4 illustrates a system architecture upon which aspects of the present disclosure can be implemented.

FIG. 4 illustrates a system architecture 400 upon which aspects of the examples herein can be implemented. This system architecture 400 includes a more detailed view of the cache manager (e.g., cache manager 252), included in FIG. 4 in a cache management layer 454. This example includes more than one cache manager 452. As illustrated in FIG. 4, program code in a logic layer 415 obtains workloads 411 (which include queries). In a logic layer referred to as coordinator 451, program code assigns various portions of the workloads 411 and various workloads 411 to various resources 418. The various resource 418 execute the (assigned) queries against database tables and/or obtain results from a shared cache table (e.g., FIG. 2, cache table 232). As depicted in FIG. 4, a cache manager 452 manages execution of the program code utilizing resources such as the memories 453 on various system nodes 456. The program code of the cache manager 452 actively manages the contents of the cache platform 432, which comprises cached query results, from which the program code obtains workload query results. The cache platform 432 is at the storage and execution layer 474, with various database tables 434 and additional database storage available to the other executor, e.g., executor tables 436 (labeled other executor in FIG. 4 to designate which resource utilizes the executor tables 436).

In the cache manager layer 454, the program code generates an execution and cache plan 457, which it provides to the cache managers 452 on the various nodes X, Y, and Z. The program code manages the cache platform 432 utilizing program code comprising a coordinator 451 (e.g., a logic layer). The coordinator includes catalog metadata stored by a cache manager 452, which the program code provides to a cache coordinator 461 and a query optimizer 462. The query optimizer generates an execution plan 463 to provide to the cache coordinator 461, such that these metadata 452 can be utilized both to optimize the queries, which are to pull results from the managed cache(s) in the cache platform 432, and, also, to coordinate the cache managers 452 and which portions of the queries in the workloads (or chunks) 464, for which each will provide results.

The program code distributes various workloads as well as portions of the workloads 414, 419 to various resources 418 of the heterogeneous database system, including a given portion 414 the other (e.g., secondary, tertiary, etc.) executor (e.g., FIG. 2, 224, 226) that executes queries on the tables referenced in the query, referred to herein as executor tables 436 and a given portion 419 to database querying resource (e.g., FIG. 2, 223) that execute queries on various database tables 434.

The cache managers 452 on the different nodes in FIG. 4 demonstrate to concurrency and synchronization when the program code in the examples herein enables chunks of workloads 464 to obtain query results from a cache platform 432 comprising resources on different nodes, Node X, Node Y, and Node Z. In the technical architecture 400, the components can communicate using various protocol, including but not limited to, TCP/IP, DRDA, and/or REST. When data is sent or received between components (e.g., an executive component to and from parser components, optimizer components, and run-time components, and the run-time component to and from one or more engine components), in some examples, a sender of the data serializes the data and a receiver deserializes the data. In some examples, the program code can allocate and reallocate memory 453 as needed on the various nodes to accommodate the exchange of data.

Figure 5:
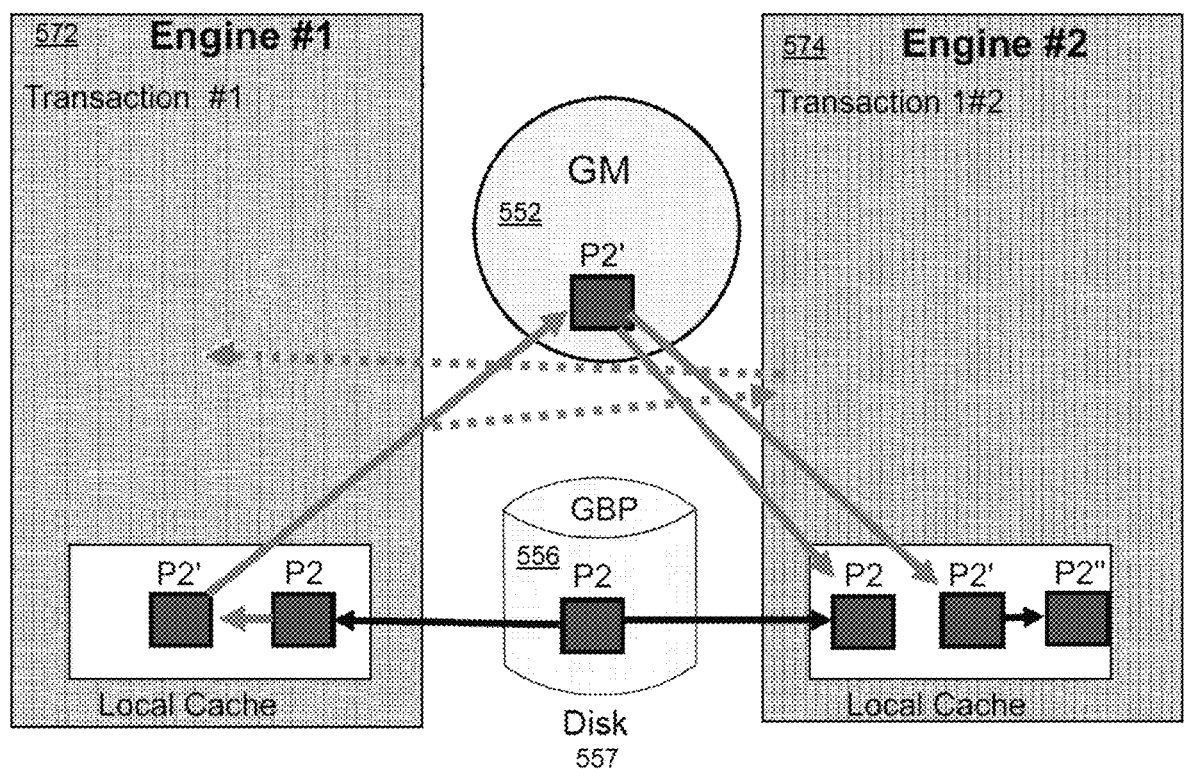
FIG. 5 further illustrates the concurrency and synchronization enabled by program code in various examples in the present disclosure.

FIG. 5 further illustrates the concurrency and synchronization enabled by program code in various examples herein. A global cache manager 552 in FIG. 5 distributes different workloads on different engines. When the program code determines that the same query block is present in a query to be executed on a given engine that was already executed on another engine, or is scheduled to be executed on another engine (e.g., simultaneously), the program code retains the result of the common query block in a global buffer pool so that it can be utilized by both engines. In the illustration 500, transaction 1 (which is a common query block) was distributed, in different workloads, to engine #1 572 and engine #2 574 by GM 552 (the global cache manager). The GM 552 stores results of a common query block (QB) for reuse in the GBP 556 (global buffer pool) (on a disk 557, in this example with the GM 552) for reuse. FIG. 5 illustrates the program code determining that one or more workloads comprise the same query block and thus, the GM 552 executes the query block (P2, P2' on one engine and stores the results in the GBP 556. Thus, the results of the query block can be re-used responsive to the query block appearing in additional workloads.

In the examples herein, program code identifies common query blocks in differing workloads and distributes the workloads to various systems resources (including to a shared cache), from which to obtain query results. To identify common query blocks in different workloads, program code in some examples normalizes the queries in workloads and performs query block analytics (e.g., FIG. 3, 330).

Figure 6:
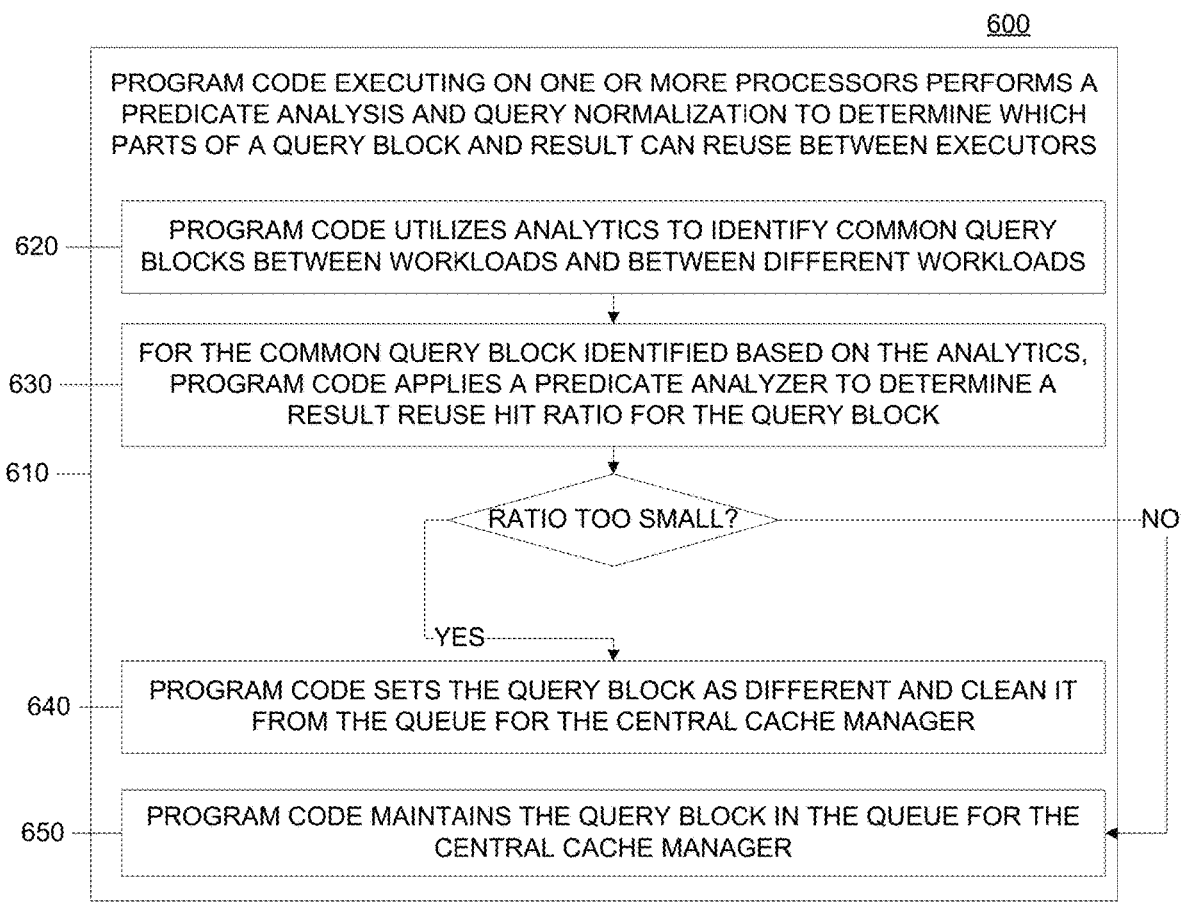
FIG. 6 is a workflow that illustrates aspects of normalization and analysis performed in the present disclosure.

FIG. 6 is a workflow 600 that illustrates aspects of this normalization and analysis. In some examples herein, program code executing on one or more processors performs a predicate analysis and query normalization to determine which parts of a query block and result can reuse between executors (resources of the system which can execute queries) (610). The program code utilizes analytics to identify common query blocks in workloads and between different workloads (620). For the common query block identified based on the analytics, the program code applies a predicate analyzer to determine a result reuse hit ratio for the query block (630). If the hit ratio is too small (based on a pre-defined threshold), the program code sets the query block as different and cleans it from the queue for the central cache manager (640). If the hit ratio is above or equal to the threshold, the program code maintains the query block in the queue for the central cache manager (650). Thus, the program code preserves in the cache the query results which contribute to efficiency in processing (in some cases, executing the query block more than once is the more efficient approach). When this process is executed by program code in a heterogeneous database, each part of the workflow 600 can run in parallel, independently.

FIG. 7 illustrates the functionality of a predicate analyzer which can be utilized to determine whether query block results can be reused between executors in the examples herein.

FIG. 7 identifies three values with commonalities, P_PARTKEY=PS_PARTKEY, P_PARTKEY=L_PARTKEY, and L_PARTKEY=PS_PARTKEY. The program code identifies these values as related SQL expressions. The program code obtains analytics related to these SQL expressions. Table 1 below include statistics for these values.

TABLE 1

| Name | Type | Cardinality | High2Key | Low2Key | Frequency |
|---|---|---|---|---|---|
| P_PARTKEY | INTEGER | 164176 | 180000 | 10000 | |
| PS_PARTKEY | INTEGER | 38305 | 43304 | 5002 | |
| L_PARTKEY | INTEGER | 200000 | 199999 | 2 | 15000 Times 5000 |

Figure 8:
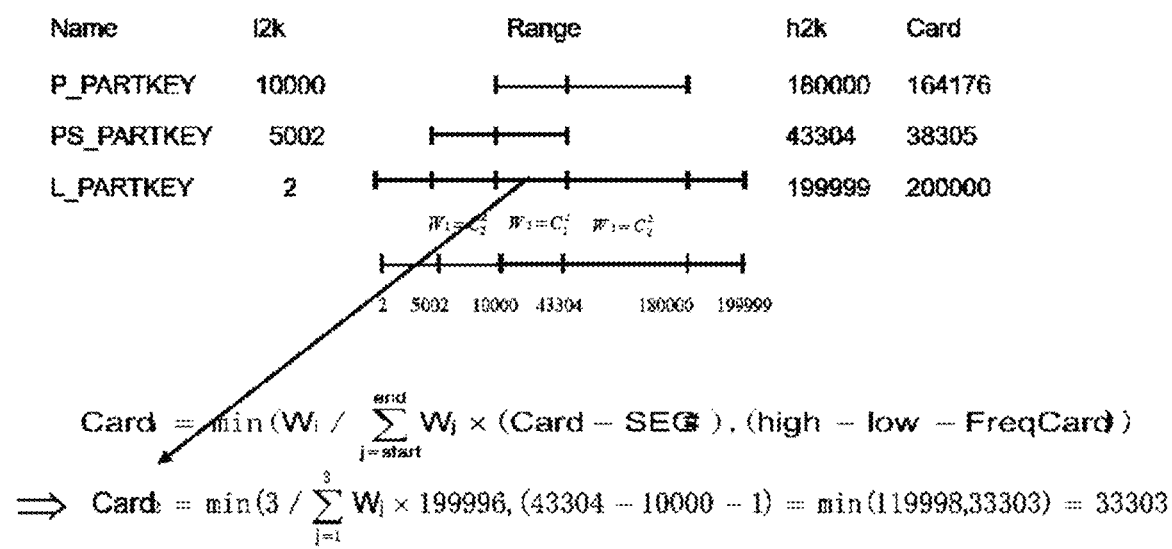
FIG. 8 illustrates an analysis of predicates and the statistics which can be performed by the program code in the present disclosure.

FIG. 8 illustrates an analysis of these predicates and the statistics which can be performed by the program code based on obtaining these values. FIG. 8 illustrates a range for each value and calculates a cardinality.

The program code normalizes queries to identify common query blocks. The commonality may not be readily apparent to the program code until the queries are normalized. For example. FIGS. 9A and 9B represent two contrasting queries, one with a host variable (FIG. 9A) and one without a host variable (FIG. 9B). FIG. 10A is a subquery pattern mutation with a table expression performed by the program code while FIG. 10B is a subquery mutation pattern in the subquery, performed by the program code.

Figure 12:
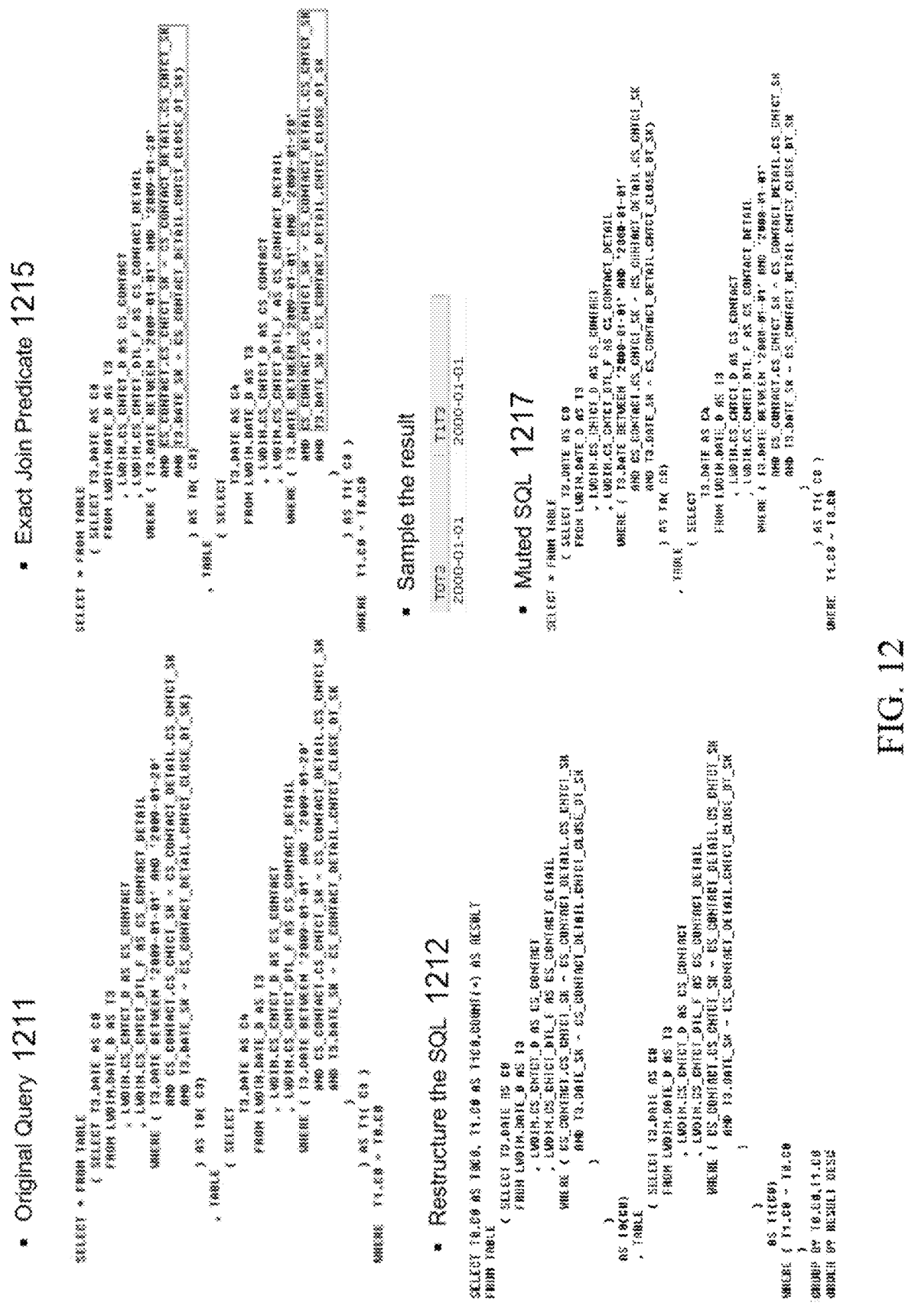

FIGS. 11-12 illustrate the program code (in some examples) normalizing a query and performing an analytical analysis on a subquery (to craft the query into a form in which it can be compared to other query blocks). In FIG. 11, the program code does not extract predicates (as there are none), while in FIG. 12, the program code extracts predicates. FIG. 11 illustrates the original query 1111, the program code restructuring the query 1112, a sample result 1114, for this restructuring, another restructuring of the query 1113, a sample result 1116 for this restructuring, and muted SQL 1117 (e.g., excluded statements). There is no predicate to extract 1115. FIG. 12 also illustrates a similar process but in this case, there are predicates, which the program code extracts. Hence, FIG. 12 illustrated the original query 1211, the extracting the (e.g., join) predicates 1215 by the program code, the program code restructuring the query 1212, the sample result 1216, and the muted SQL 1217.

Figure 13:
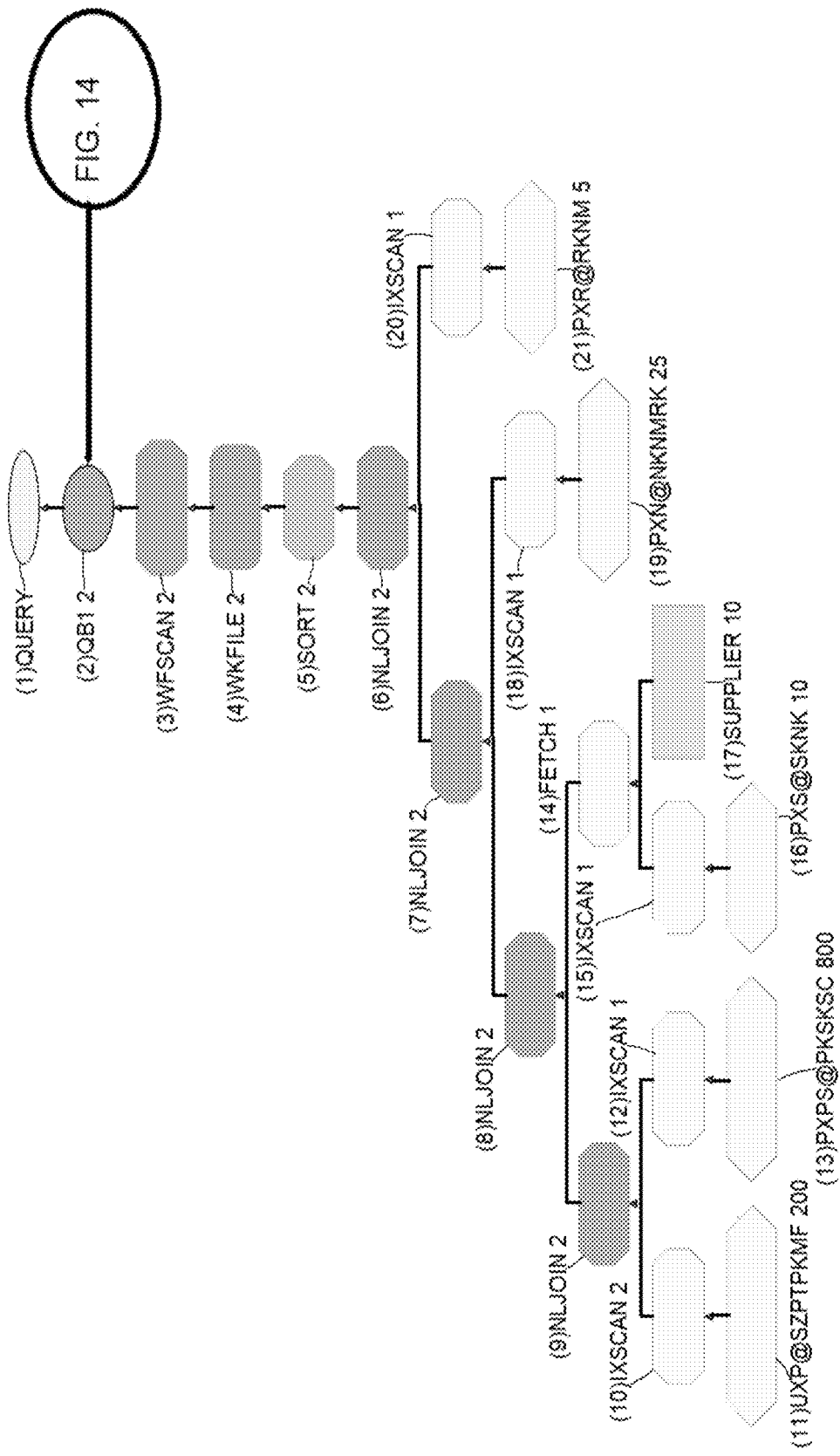
FIG. 13 illustrates aspects comprising a query that can be analyzed in the present disclosure.
Figure 14:
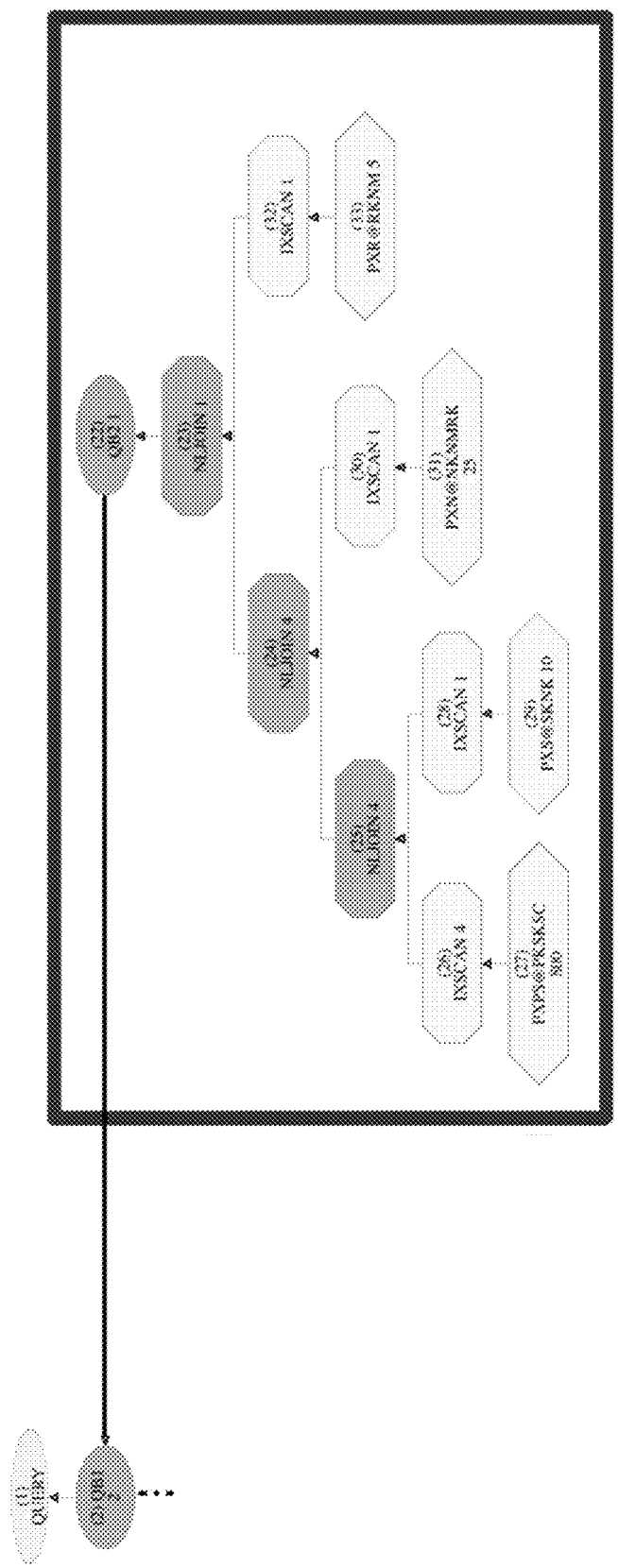
FIG. 14 illustrates a similar aspect of two queries identified by the program code in the present disclosure.

An example of similar query block that program code in some examples can identify and hence, reuse (enabling subsequent queries that utilize the same query block to pull from a cache instead of executing on a database), are query blocks that include similar select lists with a different sort. The two queries are reproduced below while FIG. 13 illustrates aspects of these two queries. The program code in various examples herein can determine that item (2) in the query, QB1 is shared by both queries in FIG. 13 (which the two queries reproduced below). Thus, the program code can normalize this portion of the query such that both queries (which can be in different workloads) can share query results (e.g., in a cache). FIG. 14 illustrates a normalized version of the query block which is shared by the two queries.

Below is an example of two such queries.

First Query:
SELECT/*S01Tbs1e30dS180*/T1.MIGR_CD,
T1.KNGK,
T1.C1,
T1.C2,
T1.C3,
T1.C4 FROM TBS1E30D T1,
TBS1C10M T2 WHERE T1.C5=T2.C5
AND T1.C6=:ukhrib AND T1.MIGR_CD=:migrcd AND
T1.C7=:ukirskfsktsnkshed AND
T1.C8=:ukirskfrktshbtcd AND
T2.C9< >
:ukhrismshukishtrykyuhflg ORDER BY
T1.C4 ASC,
T1.C1 ASC,
T1.C2 ASC,
T1.C3 ASC QUERYNO 240532:

Second Query:
SELECT/*S01Tbs1e30dSI80*/T1.MIGR_CD.
T1.KNGK,
T1.C1,
T1.C2,
T1.C3,
T1.C4 FROM TBS1E30D T1,
TBS1C10M T2 WHERE T1.C5=T2.C5
AND T1.C6=:ukhrib AND T1.MIGR_CD=:migrcd AND
T1.C7=:ukirskfsktsnkshcd AND
T1.C8=:ukirskfrktshbted AND
T2.C9< >
:ukhrismshukishtrykyuhflg ORDER BY
T1.C2 ASC,
T1.C4 ASC,
T1.C1 ASC,
T1.C3 ASC: QUERYNO 240533:

Program code in some embodiments of the present invention can normalize these queries and recognize a similar query block. The similar query block is reproduced below:
SELECT   S_ACCTBAL,  S_NAME,  N_NAME,
P_PARTKEY, P_MFGR,
S_ADDRESS, S_PHONE, S_COMMENT
FROM PART, SUPPLIER, PARTSUPP, NATION,REGION
WHERE P_PARTKEY=PS_PARTKEY
AND S_SUPPKEY=PS_SUPPKEY
AND P_SIZE<15
AND P_TYPE LIKE '% BRASS'
AND S_NATIONKEY=N_NATIONKEY
AND N_REGIONKEY=R_REGIONKEY
AND R_NAME='EUROPE'
AND PS_SUPPLYCOST=(
SELECT MIN(PS_SUPPLYCOST)
FROM PARTSUPP, SUPPLIER, NATION, REGION
WHERE P_PARTKEY=PS_PARTKEY
AND S_SUPPKEY=PS_SUPPKEY
AND S_NATIONKEY=N_NATIONKEY
AND N_REGIONKEY=R_REGIONKEY
AND R_NAME='EUROPE')
ORDER BY S_ACCTBAL DESC, N_NAME, S_NAME, P_PARTKEY;

In the examples herein, for a heterogenous database, each part on a given query can run parallel, independently. In some examples, the same QB, such as the QB in FIGS. 13 and 14 can run in one engines and the program code can retain the result in a GBP for reuse. In order to maintain efficiencies within the system, the program code can dynamically reallocate memory to different execution methods. The program code farms the portions of the workload(s) to a generate a results and determines whether results from previous queries (or concurrent queries) can be utilized as query results. In the examples herein, in a (e.g., NoSQL) heterogenous database the program code can utilize join-pairs (tables with join relationships) via a semi-join from the dimension to the fact table index can dynamically parallel run on different executors and the program code can filter intersection via a fact table with ANDing. ANDing is when multiple indexes are used in a single hint such that a query optimizer can enforce an order of the indexes in the index hints; ANDing applies as many conditions as possible on each index accessed.

Figures 16, 17:
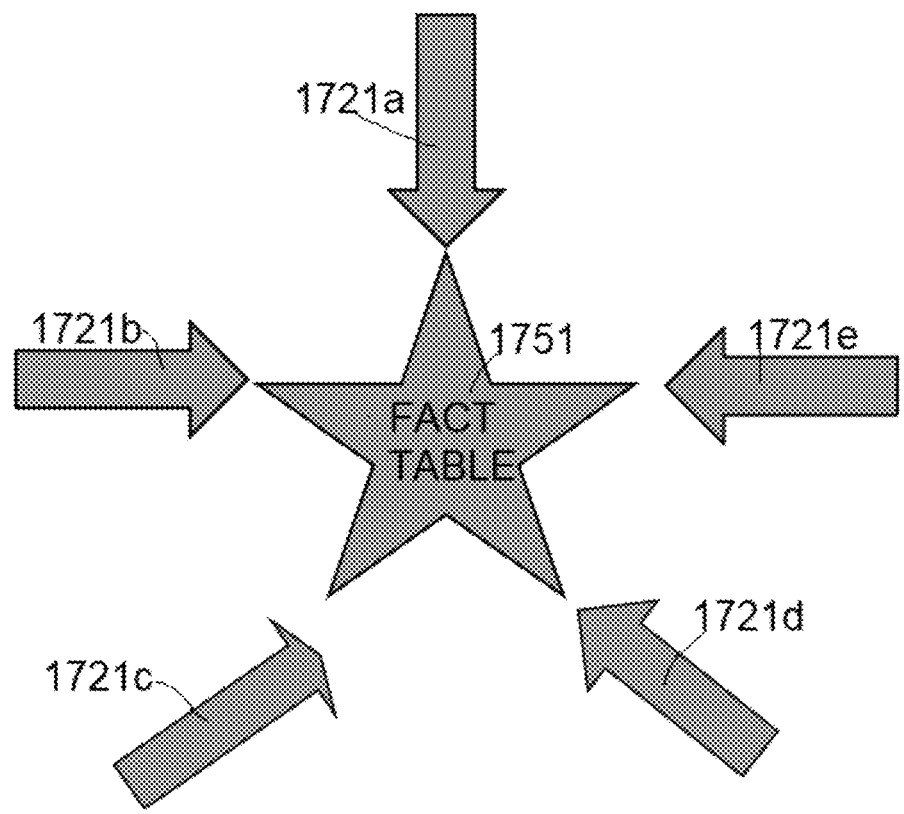
FIG. 16 illustrates the structure of a NoSQL selector, which can be normalized by program code in the present disclosure.
FIG. 17 illustrates an intersection identified by program code in the present disclosure which the program code can utilize to update a fact table.

The use of a fact table in examples herein that are implemented in a system that include a NoSQL heterogenous database are illustrated by FIGS. 15-18. FIG. 15 illustrates the structure of general documents in a NoSQL database. This specific example include five document (e.g., doc1, doc2, doc3, doc4, and doc5). Each includes descriptors of an individual, including first name, last name, age, and location. FIG. 16 includes two fields, the first field includes a selector 1601 for search, which is comparable to the SELECT statement in a relational database. The second field 1602 contains a list of fields and an order for the result (output) of the selector 1601. The SQL statement that is the equivalent of the selector 1601 is reproduced below:
select*from Table
where
lastname="Greene" and
firstname="Anna" and
Job="oper" and
"order address"="Software park B28" and
"address"="TianTongYuan #2" and
"Billmonth"="current" and
"Billamount"="20"
Order by age asc, lastname asc FIG. 17 illustrates a fact table 1751 and how join-pairs (tables with join relationships) via a semi-join form a dimension to the fact table index and hence, how these processes can dynamically run in parallel on different executors. The program code filters the intersections (1721a-1721e) via the fact table 1751 with ANDing.

Although various embodiments are described above, these are only examples. For example, reference architectures of many disciplines may be considered, as well as other knowledge-based types of code repositories, etc., may be considered. Many variations are possible.

The examples herein include computer-implemented methods, computer systems, and computer program products that include program code that, when executed by one or more processors, schedules query execution of one or more queries in a heterogenous database system by assigning portions of one or more workloads to resources for execution. In some examples, the program code obtains one or more queries, where each query of the one or more queries comprises the one or more workloads. The program code obtains execution statistics for the one or more workloads. The program code normalizes the one or more queries. To normalize the queries, the program code can generate cost analytics for query blocks comprising the one or more queries, identify, based on the cost analytics, similar cost analytics for one or more query blocks across the one or more queries, and apply a cost model to the one or more query blocks across with the similar cost analytics to identify at least one query block for result reuse across at least two queries of the one or more queries. The program code distributes, based on the execution statistics, the one or more queries to a portion of the resources. To distribute the one or more queries, the program code assigns the at least one query block in a first query of the two queries to a first resource to execute the at least one query block against one or more database tables of the heterogenous database system and assigns the at least one query block in a second of the two queries to a second resource to execute the at least one query block against a shared cache of the heterogenous database system.

In some examples, the program code executes, via the portion of resources, the one or more queries by executing, via the first resource, the at least one query block against the one or more database tables. The program code obtains results of the first resource executing the at least one query block again the one or more database tables. The program code caches the results of the first resource in the shared cache. The program code executes, via the second resource, the at least one query block against the shared cache.

In some examples, a first workload of the one or more workloads comprises the first query of the two queries and a second workload of the one or more workloads comprises the second query of the two queries.

In some examples, the program code distributing the one or more queries comprises: the program code broadcasting, for each workload of the one or more workloads, one or more query distributions to the resources, and the program code utilizing the execution statistics, to select a distribution for each query of the one or more query distributions for each portion of each workload of the one or more workloads.

In some examples, the program code utilizing the execution statistics to select the distribution comprises the program code determining, for each portion of each workload of the one or more workloads whether a selected resource will obtain results for the portion of the workload from one or more database tables or from the shared cache.

In some examples, the program code manages the shared cache.

In some examples, the program code distributing the one or more queries comprises: the program code obtaining, at a logic layer, the one or more queries. The program code assigns, in the logic layer, portions of workloads comprising the one or more queries to a portion of the resources, where each assignment specifies to each resource whether to obtain results from database tables of the one or more database tables, where the database tables are referenced in the assigned portion, or to obtain results from the shared cache, and where the shared cache comprises one or more shared cache tables. The program code obtains, from storage accessed by the first resource, results for the at least one query block. The program code stores the results of the at least one query block in the shared cache for reused by the second resource.

In some examples, the program code monitors the executing of the one or more queries by the portion of the resources. Based on the monitoring, the program code writes quantitative throughout information to a fact table.

In some examples, the quantitative throughout information comprises: records of workloads of the one or more workloads distributed to resources of the portion of resources selected from the group consisting of: shared cache querying resources and database querying resources.

In some examples, the program code distributing is also based on the quantitative throughout information in the fact table.

In some examples, the program code executing the one or more queries comprises certain of the portion of the resources obtaining results concurrently.

In some examples, the program code distributing comprises the program code analyzing query predicates in the one or more queries.

In some examples, the program code visualizes, to a user, via an interface, the distributing.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of scheduling query execution of one or more queries in a heterogenous database system by assigning portions of one or more workloads to resources for execution, the method comprising:
   obtaining, by one or more processors, more than one query, wherein each query of the more than one query comprises the one or more workloads;
   obtaining, by the one or more processors, execution statistics for the one or more workloads;
   normalizing, by the one or more processors, the more than one query, wherein the normalizing comprises:
     generating, by the one or more processors, cost analytics for query blocks comprising the more than one query;
     identifying, by the one or more processors, based on the cost analytics, similar cost analytics for one or more query blocks across the more than one query; and
     applying, by the one or more processors, a cost model to the one or more query blocks across with the similar cost analytics to identify at least one query block for result reuse across at least two queries of the more than one query;
   distributing, by the one or more processors, based on the execution statistics, the more than one query to a portion of the resources, wherein the distributing comprises assigning the at least one query block in a first query of the two queries to a first resource to execute the at least one query block against one or more database tables of the heterogenous database system and assigning the at least one query block in a second query of the two queries to a second resource to execute the at least one query block against a shared cache of the heterogenous database system; and executing, by the one or more processors, via the portion of the resources, the more than one query, wherein the executing comprises:

executing, by the one or more processors, via the first resource, the at least one query block against the one or more database tables of the heterogenous database system;

obtaining, by the one or more processors, results of the first resource executing the at least one query block again the one or more database tables;

caching, by the one or more processors, the results of the first resource in the shared cache, wherein the shared cache is shared between different workload queries;

executing, by the one or more processors, via the second resource, the at least one query block against the shared cache instead of against the one or more database tables of the heterogenous database; and obtaining, by the one or more processors, results of the second resource executing the at least one query block against the shared cache.

2. The computer-implemented method of claim 1, wherein a first workload of the one or more workloads comprises the first query of the two queries and a second workload of the one or more workloads comprises the second query of the two queries.

3. The computer-implemented method of claim 1, wherein the distributing the more than one query comprises:

broadcasting, by the one or more processors, for each workload of the one or more workloads, one or more query distributions to the resources; and utilizing, by the one or more processors, the execution statistics to select a distribution for each query of the one or more query distributions for each portion of each workload of the one or more workloads.

4. The computer-implemented method of claim 3, wherein utilizing the execution statistics to select the distribution comprises determining, for each portion of each workload of the one or more workloads, whether a selected resource will obtain results for the portion of the workload from the one or more database tables or from the shared cache.

5. The computer-implemented method of claim 1, further comprising:

managing, by the one or more processors, the shared cache.

6. The computer-implemented method of claim 5, wherein the distributing the more than one query comprises:

obtaining, by the one or more processors, at a logic layer, the more than one query;

assigning, by the one or more processors, in the logic layer, portions of the one or more workloads comprising the more than one query to the portion of the resources, wherein each assignment specifies to each resource whether to obtain results from database tables of the one or more database tables, wherein the database tables are referenced in the assigned portion, or to obtain results from the shared cache, and wherein the shared cache comprises one or more shared cache tables;

obtaining, by the one or more processors, from storage accessed by the first resource, results for the at least one query block; and storing, by the one or more processors, the results of the at least one query block in the shared cache for reused by the second resource.

7. The computer-implemented method of claim 1, further comprising: monitoring, by the one or more processors, the executing of the more than one query by the portion of the resources; based on the monitoring, writing, by the one or more processors, quantitative throughput information to a fact table.

8. The computer-implemented method of claim 7, wherein the quantitative throughout information comprises: records of workloads of the one or more workloads distributed to resources of the portion of resources selected from the group consisting of: shared cache querying resources and database querying resources.

9. The computer-implemented method of claim 7, wherein the distributing is also based on the quantitative throughout information in the fact table.

10. The computer-implemented of claim 1, wherein the executing the more than one query comprises certain of the portion of the resources obtaining the results concurrently.

11. The computer-implemented method of claim 1, wherein the distributing comprises analyzing query predicates in the more than one query.

12. The computer-implemented method of claim 1, further comprising:

visualizing, by the one or more processors, to a user, via an interface, the distributing.

13. A computer system for scheduling query execution of one or more queries in a heterogenous database system by assigning portions of one or more workloads to resources for execution, the computer system comprising:

a memory; and one or more processors in communication with the memory, wherein the computer system is configured to perform a method, said method comprising:

obtaining, by the one or more processors, more than one query, wherein each query of the more than one query comprises the one or more workloads;

obtaining, by the one or more processors, execution statistics for the one or more workloads;

normalizing, by the one or more processors, the more than one query, wherein the normalizing comprises:

generating, by the one or more processors, cost analytics for query blocks comprising the more than one query;

identifying, by the one or more processors, based on the cost analytics, similar cost analytics for one or more query blocks across the more than one query; and applying, by the one or more processors, a cost model to the one or more query blocks across with the similar cost analytics to identify at least one query block for result reuse across at least two queries of the more than one query;

distributing, by the one or more processors, based on the execution statistics, the more than one query to a portion of the resources, wherein the distributing comprises assigning the at least one query block in a first query of the two queries to a first resource to execute the at least one query block against one or more database tables of the heterogenous database system and assigning the at least one query block in a second query of the two queries to a second resource to execute the at least one query block against a shared cache of the heterogenous database system; and executing, by the one or more processors, via the portion of the resources, the more than one query, wherein the executing comprises:

executing, by the one or more processors, via the first resource, the at least one query block against the one or more database tables of the heterogenous database system;

obtaining, by the one or more processors, results of the first resource executing the at least one query block again the one or more database tables;

caching, by the one or more processors, the results of the first resource in the shared cache, wherein the shared cache is shared between different workload queries;

executing, by the one or more processors, via the second resource, the at least one query block against the shared cache instead of against the one or more database tables of the heterogenous database; and obtaining, by the one or more processors, results of the second resource executing the at least one query block against the shared cache.

14. The computer system of claim 13, wherein a first workload of the one or more workloads comprises the first query of the two queries and a second workload of the one or more workloads comprises the second query of the two queries.

15. The computer system of claim 13, wherein the distributing the more than one query comprises:

broadcasting, by the one or more processors, for each workload of the one or more workloads, one or more query distributions to the resources; and utilizing, by the one or more processors, the execution statistics to select a distribution for each query of the one or more query distributions for each portion of each workload of the one or more workloads.

16. The computer system of claim 15, wherein utilizing the execution statistics to select the distribution comprises determining, for each portion of each workload of the one or more workloads whether a selected resource will obtain results for the portion of the workload from the one or more database tables or from the shared cache.

17. The computer system of claim 13, the method further comprising:

managing, by the one or more processors, the shared cache.

18. A computer program product for scheduling query execution of one or more queries in a heterogenous database system by assigning portions of one or more workloads to resources for execution, the computer program product comprising:

one or more computer readable storage media and program instructions collectively stored on the one or more computer readable storage media readable by at least one processing circuit to:

obtain, by one or more processors, more than one query, wherein each query of the more than one query comprises the one or more workloads;

obtain, by the one or more processors, execution statistics for the one or more workloads;

normalize, by the one or more processors, the more than one query, comprising:

generating, by the one or more processors, cost analytics for query blocks comprising the more than one query;

identifying, by the one or more processors, based on the cost analytics, similar cost analytics for one or more query blocks across the more than one query; and applying, by the one or more processors, a cost model to the one or more query blocks across with the similar cost analytics to identify at least one query block for result reuse across at least two queries of the more than one query;

distribute, by the one or more processors, based on the execution statistics, the more than one query to a portion of the resources, wherein the distributing comprises assigning the at least one query block in a first query of the two queries to a first resource to execute the at least one query block against one or more database tables of the heterogenous database system and assigning the at least one query block in a second query of the two queries to a second resource to execute the at least one query block against a shared cache of the heterogenous database system; and execute, by the one or more processors, via the portion of the resources, the more than one query, wherein the executing comprises:

execute, by the one or more processors, via the first resource, the at least one query block against the one or more database tables of the heterogenous database system;

obtain, by the one or more processors, results of the first resource executing the at least one query block again the one or more database tables;

cache, by the one or more processors, the results of the first resource in the shared cache, wherein the shared cache is shared between different workload queries;

execute, by the one or more processors, via the second resource, the at least one query block against the shared cache instead of against the one or more database tables of the heterogenous database; and obtain, by the one or more processors, results of the second resource executing the at least one query block against the shared cache.

\* \* \* \* \*